June 15, 1965  J. MONTAGINO  3,189,336
METALLURGICAL HEATING FURNACE
Filed Nov. 15, 1962  2 Sheets-Sheet 1
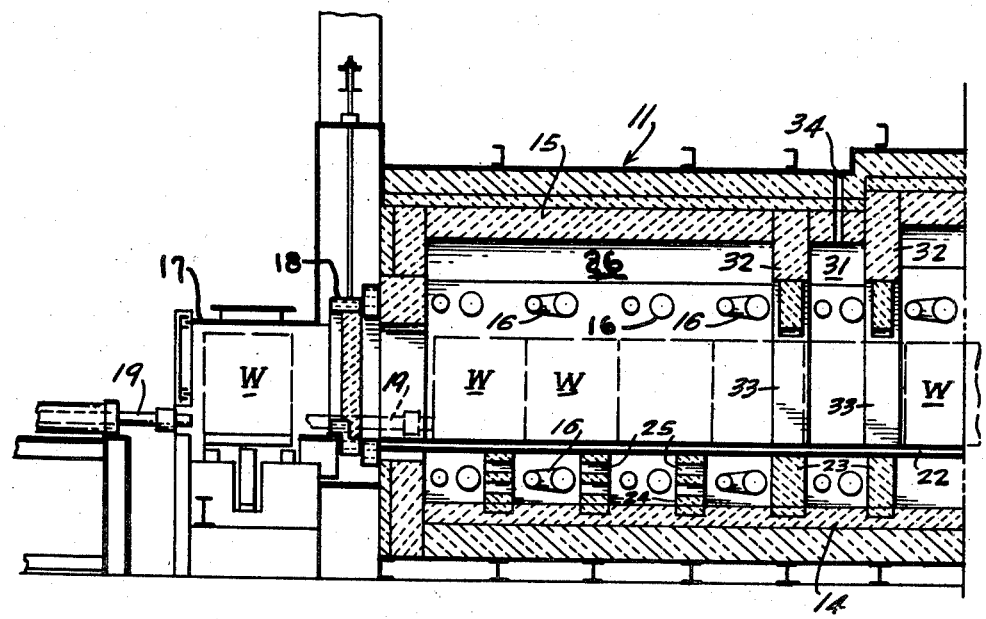
FIG-1A-
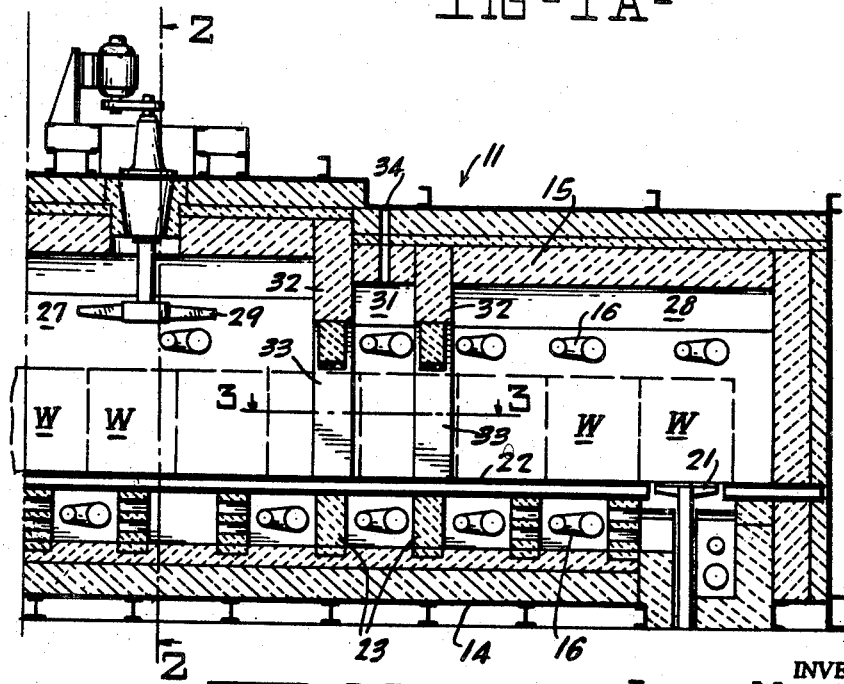
FIG-1B-
INVENTOR:
JOSEPH MONTAGINO.
BY
Alfred L. Patmore Jr.
ATTORNEY.

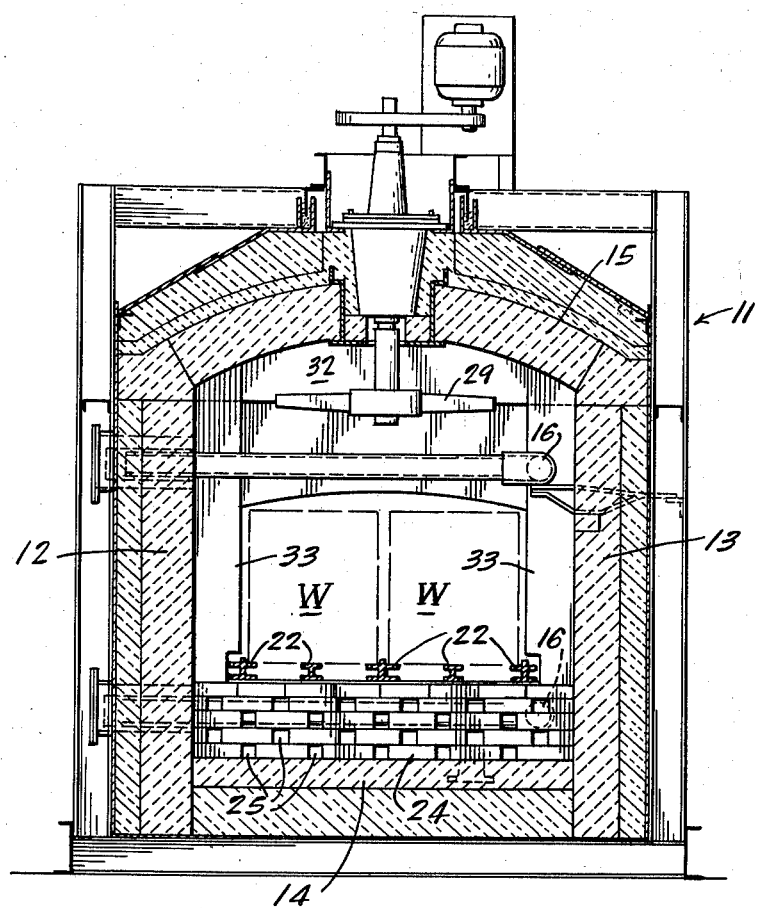
FIG-2-
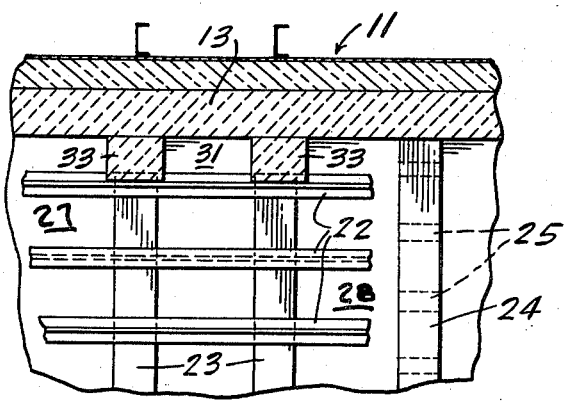
FIG-3-
INVENTOR:
JOSEPH MONTAGINO.
BY
ATTORNEY

United States Patent Office 3,189,336
Patented June 15, 1965

3,189,336
METALLURGICAL HEATING FURNACE
Joseph Montagino, Toledo, Ohio, assignor to Midland-Ross Corporation, Toledo, Ohio, a corporation of Ohio
Filed Nov. 15, 1962, Ser. No. 237,865
1 Claim. (Cl. 263—36)

This invention relates to an improvement in metallurgical heating furnaces. More particularly, the invention relates to an improvement in metallurgical heating furnaces of the type having a series of treating zones wherein the work being heated is successively exposed to a treating atmosphere of differing chemical composition in each of the treating zones in the series. More particularly, the invention relates to improved means for separating successive zones in such a furnace to minimize the contamination of the treating atmosphere in a treating zone when the treating atmosphere from another treating zone flows thereinto.

In the prior art it is customary to metallurgically treat a metal work piece by exposing it at elevated temperatures to the action of a series of gaseous atmospheres of predetermined chemical composition. Continuous gas carburizing is an example of such treatment and comprises a process wherein a ferrous metal part is treated, in a continuous or straight through furnace by, first, exposing it to a gaseous atmosphere of high carbon potential to add carbon to the outer layers thereof and, second, by cooling it in an atmosphere of lower carbon potential to a temperature from which it is quenched for hardening.

For optimum control over the metallurgical treating process it is desirable to minimize the intermixing of atmosphere in adjacent treating zones. In conventional continuous gas carburizing furnaces, wherein the workpieces are contained in trays which are skidded through the furnace on a hearth of longitudinal rails supported on transverse refractory piers, it is common to segregate adjacent zones by using a furnace pier of solid construction at the juncture of adjacent zones, in register with a drop arch extending downwardly from the furnace roof substantially to the upper level of the work-filled trays on the furnace hearth. While this technique has been employed with moderate success is furnaces of older design its effectiveness as an atmosphere seal between adjacent zones in a continuous furnace is, in current practice, often not acceptable. That this is so is due partly to more stringent quality specifications which govern the processing operation, and partly to the atmosphere turbulence prevailing from the use of atmosphere recirculating fans of much higher capacity than those used in furnaces of older design.

It is, therefore, the object of this invention to provide improved means for segregating adjacent zones in a metallurgical treating furnace to minimize the contamination of the treating atmosphere in one zone when the treating atmosphere from another zone flows thereinto. For other objects of the invention and for a further consideration of what is considered to be novel and inventive attention is directed to the following portion of the specification, the drawing, and the appended claim.

In the drawing:

FIGURE 1A is a vertical sectional view of the left hand portion of a furnace embodying the invention;

FIGURE 1B shows the right hand portion of the furnace shown in FIGURE 1A with the complete furnace being illustrated when the match line of FIGURE 1B is matched with the match line of FIGURE 1A;

FIGURE 2 is an elevational sectional view taken on line 2—2 of FIGURE 1B;

FIGURE 3 is a fragmentary plan sectional view taken on line 3—3 of FIGURE 1B.

In the illustrated embodiment of the invention, there is illustrated an elongate furnace 11 formed by appropriate refractory lined wall means including side walls 12 and 13, bottom 14, and roof 15 constructed in the form of an arch. Furnace 11 is a continuous furnace and is of the type wherein workpieces, stacked in trays W as indicated by discontinuous lines, are exposed to carefully controlled conditions of temperature and atmosphere composition for metallurgical treatment. Accordingly, furnace 11 is heated by means of a plurality of radiation elements 16, such as internally fuel fired hairpin radiant tubes, and is provided with a vestibule 17 at the inlet end.

Fresh trays W are added to vestibule 17 during periods when furnace door 18 is closed, usually in groups of two. These trays are advanced into the chamber of furnace 11 by the action of pusher 19 after vestibule 17 has been purged, furnace door 18 elevated, and a group of trays at the discharge end of the furnace removed through an opening in the side wall (not shown) by the operation of extractor 21. The degree of advance imparted by pusher 19 to the trays in vestibule 17 is indicated by discontinuous lines and is sufficient to advance all the trays in the chamber by one tray length. Within the chamber of furnace 11 trays W are supported on longitudinally extending skid rails 22 which, in turn, are supported above the furnace floor on transversely extending spaced apart piers. As will be hereinafter more thoroughly explained, some of the piers 23 are of substantially solid construction and are substantially impervious to the flow of atmosphere within the furnace, and the remainder of the piers 24 are provided with a large number of small openings 25 and are, therefore, highly pervious to the flow of furnace atmosphere.

For proper processing of the workpieces in trays W, furnace 11 is arranged in a series of treating zones 26–28. A typical application for such a furnace would be in gas carburizing of ferrous metal workpieces. In such an application zone 26 would be utilized as a heating zone to heat the workpieces to an appropriate temperature for carburizing; zone 27 would be provided with a gaseous atmosphere of high carbon potential and would be utilized to add carbon to the outer layers of the workpieces in trays W; and zone 28 would be provided with atmosphere of a lower carbon potential and would be used to cool the workpieces to an appropriate temperature from which they can be hardened by quenching. It is to be noted that carburizing zone 27, as is customary in current practice, is fitted with an atmosphere recirculating fan 29. Such device is used to keep the treating atmosphere in the zone where it is employed as uniformly distributed as possible and has the side effect of creating a turbulent condition at the ends of the zone which aggravates the tendency for the treating atmosphere to intermix with treating atmosphere from the adjacent zone.

To satisfactorily prevent the treating atmosphere in one zone of the furnace from contaminating, and/or being contaminated with, the treating atmosphere in an adjacent treating zone, it is proposed, according to the present invention, to provide a narrow buffer zone 31 between adjacent treating zones. Each buffer zone 31 is defined by wall means comprising two adjacent piers 23 of substantially solid construction and two drop arches 32 extending downwardly from the furnace roof with each drop arch 32 being in vertical alignment with a pier 23 below. In a refined embodiment of the invention each of furnace side walls 12 and 13 is provided with an inwardly extending refractory pilaster 33 in vertical alignment with each drop arch-solid pier combination.

The length of a buffer zone in a furnace of a skid rail type is determined by the spacing of the piers and will normally be of the magnitude of about fifteen inches. This will generally be some small fraction, such as onequarter or less, of the length of a treating zone which may be of the magnitude of about seven feet or more.

In a continuous multiple zone atmosphere furnace wherein each treating zone is provided with its own atmosphere inlet the foregoing construction employing a buffer zone between adjacent treating zones can be most advantageously utilized by providing an atmosphere effluent 34 in each buffer zone. The continuous outward flow of atmosphere from each treating zone to the buffer zone induced by the escape of atmosphere through the effluent in the buffer zone further safeguards against the inflow into a treating zone of atmosphere from another treating zone.

It is to be noted that the concept of wall means defining a short buffer zone between adjacent treating zones may also be employed in furnace types other than skid rail furnaces such as in furnaces of the roller hearth type. However, the concept has particular value in skid rail furnaces where other atmosphere zoning techniques, such as a retractable door which completely blocks the furnace chamber when closed, may not be conveniently employed due to the obstruction posed by the skid rails themselves and the work filled trays disposed in end-to-end relationship thereon.

As will be evident to those skilled in the art, various modifications and alternatives can be made to the embodiments of this invention without departing from the spirit or scope of the invention as claimed hereinafter.

I claim:

In an atmosphere furnace having side walls, a roof, and a floor defining an elongated chamber; separating means for separating said elongate chamber into a first treating compartment and a second treating compartment in longitudinal series relationship with the first treating compartment; hearth means comprising rails extending longitudinally through the chamber; a plurality of spaced apart piers located beneath the rails and extending upwardly from the floor of the chamber and disposed transversely thereof between the side walls; radiation heating means disposed within the first treating compartment; radiation heating means disposed within the second treating compartment; and atmosphere recirculating means comprising the bladed portion of a fan impeller disposed within at least one of said first and second treating compartments for rapidly recirculating the atmosphere therein, the improvement wherein the separating means comprises, in combination: a first drop arch extending downwardly from the furnace roof in the chamber at the end of the first treating compartment that is adjacent the second treatment compartment; and a second drop arch extending downwardly from the furnace roof in the chamber at the end of the second treating compartment that is adjacent the first treating compartment, said first and second drop arches being disposed above and vertically aligned with first and second piers respectively which are disposed next to each other in the plurality of piers and being substantially impervious to the flow of atmosphere gas, the first and second arches and corresponding first and second piers defining with one another a buffer compartment intermediate the first and second treating chambers, the length of the buffer compartment being short in relationship to the lengths of the first and second treating compartments.

References Cited by the Examiner

UNITED STATES PATENTS

| | | | |
|---|---|---|---|
| 718,257 | 1/03 | Keyes | 263—6 |
| 1,851,573 | 3/32 | Elsey | 148—16.5 |
| 2,091,172 | 8/37 | Wilson | 263—6 |
| 2,872,175 | 2/59 | Guenzi | 263—8 |
| 2,953,363 | 9/60 | Nesbitt | 263—6 |
| 2,955,062 | 10/60 | Cullen et al. | 148—16.5 |
| 3,086,764 | 4/63 | Beck | 263—8 |

FOREIGN PATENTS

| | | |
|---|---|---|
| 1,108,599 | 8/55 | France. |
| 494,910 | 11/38 | Great Britain. |

CHARLES SUKALO, *Primary Examiner.*

JOHN J. CAMBY, *Examiner.*